US012425353B2

(12) United States Patent
Das Sharma et al.

(10) Patent No.: US 12,425,353 B2
(45) Date of Patent: Sep. 23, 2025

(54) POWER-CONSCIOUS INPUT/OUTPUT (I/O) BUFFER ALLOCATION

(71) Applicant: Intel Corporation, Santa Clara, CA (US)

(72) Inventors: Bikrant Das Sharma, Saratoga, CA (US); Aruni P. Nelson, Folsom, CA (US); Abdul R. Ismail, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 805 days.

(21) Appl. No.: 17/524,630

(22) Filed: Nov. 11, 2021

(65) Prior Publication Data

US 2022/0070111 A1 Mar. 3, 2022

(51) Int. Cl.
*H04L 47/722* (2022.01)
*H04L 47/762* (2022.01)
*H04L 47/80* (2022.01)
*H04L 49/9005* (2022.01)

(52) U.S. Cl.
CPC .......... *H04L 47/722* (2013.01); *H04L 47/762* (2013.01); *H04L 47/801* (2013.01); *H04L 49/9005* (2013.01)

(58) Field of Classification Search
CPC ... H04L 47/722; H04L 47/762; H04L 47/801; H04L 49/9005; H04L 47/805; H04L 47/822; H04L 47/52
See application file for complete search history.

(56) References Cited

U.S. PATENT DOCUMENTS

| | | | |
|---|---|---|---|
| 2009/0216981 A1* | 8/2009 | Diefenbaugh | G06F 13/385 |
| | | | 711/E12.001 |
| 2019/0007272 A1* | 1/2019 | Doerr | H04J 14/0267 |
| 2019/0334837 A1* | 10/2019 | Fairhurst | H04L 49/9005 |
| 2021/0058334 A1* | 2/2021 | Greth | H04L 47/32 |

* cited by examiner

*Primary Examiner* — Kibrom T Hailu
(74) *Attorney, Agent, or Firm* — Schwabe, Williamson & Wyatt, P.C.

(57) ABSTRACT

Embodiments provide apparatuses, systems, and methods related to an electronic device that includes first one or more ports to transmit data from the electronic device, and one or more buffers to buffer the data prior to transmission of the data on the ports. The electronic device may further includes a bandwidth management module to: identify a bandwidth required to transmit an amount of the data on the first one or more ports; identify bandwidth-related parameters of the first one or more ports; and identify, based on the bandwidth-related parameters and the bandwidth required to transmit the amount of the data, buffer allocation of the data. The electronic device may further include a buffer management module coupled with the bandwidth management module, the buffer management module to allocate the data to the one or more buffers based on the buffer allocation. Other embodiments may be described and claimed.

20 Claims, 9 Drawing Sheets

POWER-CONSCIOUS INPUT/OUTPUT (I/O) BUFFER ALLOCATION

FIELD

Embodiments of the present invention relate generally to the technical field of electronic circuits, and more particularly to a power control of an input/output (JO) subsystem.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by inclusion in this section.

Legacy host systems may not be configured to maximize residency in low-power states, particularly with respect to buffers. For example, buffering may be limited for the purposes of scheduling transfers without consideration of the effect of the buffer on power management of the PO subsystem.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
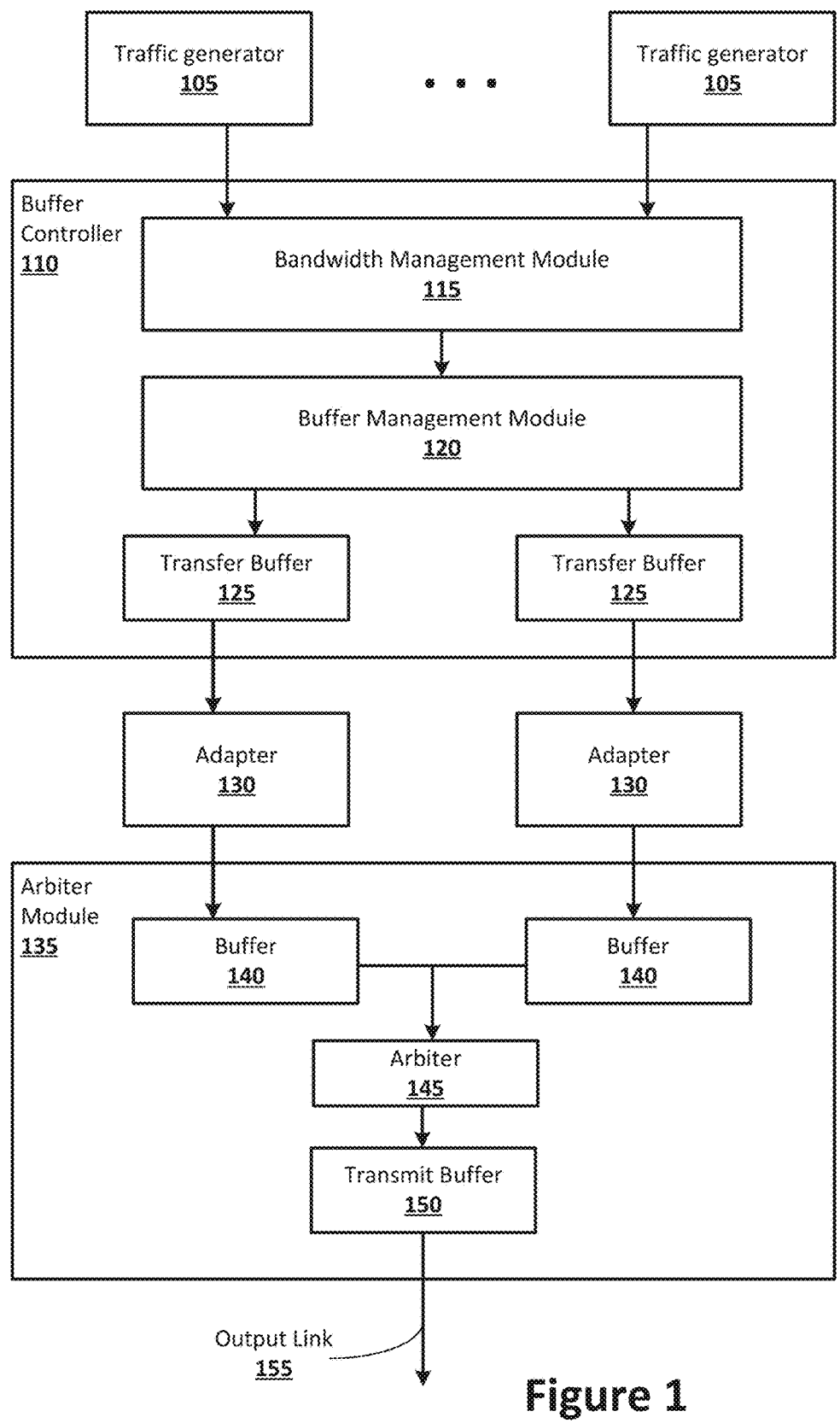
FIG. 1 illustrates an example electronic system that includes a buffer controller and an arbiter module, in accordance with various embodiments.

In the following detailed description, reference is made to the accompanying drawings that form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

The terms "substantially," "close," "approximately," "near," and "about," generally refer to being within +/−10% of a target value. Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

For the purposes of the present disclosure, the phrases "A and/or B" and "A or B" mean (A), (B), or (A and B). For the purposes of the present disclosure, the phrase "A, B, and/or C" means (A), (B), (C), (A and B), (A and C), (B and C), or (A, B, and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "circuitry" may refer to, be part of, or include an Application Specific Integrated Circuit (ASIC), an electronic circuit, a processor (shared, dedicated, or group), a combinational logic circuit, and/or other suitable hardware components that provide the described functionality. As used herein, "computer-implemented method" may refer to any method executed by one or more processors, a computer system having one or more processors, a mobile device such as a smartphone (which may include one or more processors), a tablet, a laptop computer, a set-top box, a gaming console, and so forth.

As used herein, the term "I/O transfer type" may refer to periodic or non-periodic transmission. Generally, "periodic" transmission may refer to periodic/continuous transmission where the transmitted data is time-sensitive. As one example, audio or video data may be transmitted using periodic transmission. "Non-periodic" transmission may refer to "bursty" type transmission where the data is non-time sensitive. An example of non-periodic transmission may include data being copied to a storage device. Non-periodic may also be referred to as "asynchronous" transmission.

As previously noted, legacy host systems may not be implemented to maximize residency in low-power states, particularly with respect to buffering or data transfer scheduling. For example, buffering may be limited for the purposes of scheduling data transfers for management of data flow between input and output buffers. However, such buffering may be implemented in legacy host systems without consideration of data buffering or scheduling and how those elements may affect power residency of the host system and/or IO (I/O) subsystem.

Embodiments herein may provide power savings that are commensurate with actual bandwidth usage across the system. Specifically, embodiments may analyze various parameters such as available bandwidth, actual bandwidth usage, latency requirements of the I/O transfer type that is to be transmitted, power levels of various power states, power state entry/exit times, etc.. Based on these parameters, the system may proactively buffer and schedule transfers in such a way to maximize the residency time of various elements in low-power states without sacrificing elements such as user experience, acceptable latency for a given I/O transfer type, the bandwidth required for a given I/O transfer type, etc . More specifically, embodiments herein may utilize universal serial bus (USB) power saving states to initiate entry and exit from various power states of elements of the system. Such power states may be referred to herein as Ux states (e.g., U1, U2, U3, etc.) of USB 3.x devices, or Clx states (e.g., Cl1, Cl2, Cld, etc.) for USB 4 devices, although in other embodiments the power states may have different names or designations if used with other communications protocols. Overall power saving may be further improved with updates (e.g., reduced entry and exit times) to the Ux/Clx implementation in I/O subsystems. As a result, embodiments may result in significant increase in platform power-savings with minimal, negligible, or no impact to I/O device performance.

Embodiments herein relate to a buffer controller that may increase residency of an I/O controller and I/O link in a low-power state without compromising I/O transfer latency requirements. Specifically, the buffer controller may include a bandwidth management module, and an I/O buffer management module. In some embodiments, the I/O buffer management module may additionally or alternatively be referred to as a transfer scheduler. In some embodiments, the buffer controller, and particularly the bandwidth management module may perform one or more of the following actions:

Forcing links from downward facing ports (DFPs) and/or an upward facing port (UFP) to enter power saving Ux or Clx states after completing a scheduled buffered I/O transfer, and then wake up the link immediately prior to the next schedule transfer.

Forcing a communicatively coupled device (e.g., a peripheral or some other device) to stay in a Ux or Clx electrical idle state until the buffer controller initiates an exit from that state.

Measuring entry and exit latency in various ports to which the buffer controller is coupled, comparing that latency to a theoretical latency related to a Ux or Clx state, and identifying actual performance based on resultant operating conditions.

Based on power management capabilities and requirements of various I/O controllers and links to which the buffer controller is coupled, the buffer controller may aggressively schedule buffering and I/O transfers for increased I/O subsystem low-power residency with faster U1 or Cl1 entry and exit times.

Allowing various peripheral devices, ports, or other elements of the system to report their Ux or Clx entry and exit times along with their maximum latency tolerance, and then scheduling data transfers based at least in part on those parameters.

Providing a configuration register-based mechanism for each DFP and/or a UFP to report the actual bandwidth usage in each direction (e.g., outbound and inbound) over one or more scheduling intervals, and then scheduling data transfers accordingly.

FIG. 1 illustrates an example electronic system 110 that includes a buffer controller 110 and an arbiter module 135, in accordance with various embodiments. In some embodiments, the buffer controller 110 may be similar to the buffer controller described above.

Generally, in embodiments, one or more traffic generators 105 may provide data that is to be output by the electronic system. In some embodiments, a traffic generator 105 may be an element of the electronic system 100. For example, a traffic generator 105 may be a processor, a processor core, a central processing unit (CPU), memory, or some other type of element which may generate some form of data that is to be transmitted from the electronic system 100. In another embodiment, the traffic generator 105 may be an element that is external to the electronic system 100, and is communicatively coupled with the electronic system 100. For example, the traffic generator 105 may be a peripheral device, a graphics card, or some other element that is communicatively coupled with the electronic system 100 and, particularly, the buffer controller 110. In some embodiments, the traffic generator 105 may be coupled with the electronic device by a port such as a DFP or UFP. For example, the traffic generator 105 may be coupled with the DFP or UFP by a USB connection (e.g., a USB 3.x or USB4 connection) or some other type of connection.

The buffer controller 110 may include a bandwidth management module 115 and a buffer management module 120. The specific functions of the bandwidth management module 115 and the buffer management module 120 may be described in greater detail below. Generally, the bandwidth management module 115 may be configured to identify power-related parameters of the electronic system 100 or the data. Such power-related parameters may relate to or include the maximum theoretical bandwidth of one or more ports of the system, the available bandwidth of the various ports based on both incoming and outgoing data, latency requirements of the data, supported power states of the I/O subsystem, entry/exit latencies of those power states, etc. Based on these power-related parameters, the bandwidth management module 115 may identify buffer allocations of the data. The buffer allocations and the data may be provided to the buffer management module 120. The buffer management module 120 may be configured to direct the data, or portions thereof, to one or more transfer buffers 125 of the buffer controller 110. The transfer buffers 125 may be buffers where the data is stored within the buffer controller prior to outputting to an arbiter module 135.

In some embodiments, respective ones of the transfer buffers 125 may correspond to respective ones of the traffic generators 105. That is, one transfer buffer 125 may be used only for data from a single traffic generator 105. In other embodiments, different ones of the transfer buffers 125 may correspond to different types of data (e.g., data such as control data that has a first priority level may be stored in one transfer buffer 125, while other data such as audio/visual data with a second priority level may be stored in another transfer buffer 125). In some embodiments, different transfer buffers 125 may be used for data with different latency requirements. In other embodiments, the data may be allocated to the transfer buffers 125 in accordance with other criteria.

In some embodiments, the electronic system 100 may include one or more adapters such as adapters 130. The adapters 130 may serve as data format translators. For example, if communication within the buffer controller 110 is based on one data format (e.g., USB3.x, USB4, peripheral component interconnect express (PCIe), or some other data format) and communication within the arbiter module 135 is in accordance with another format, then an adapter may serve to translate the data from one format to another format.

The arbiter module 135 may include one or more buffers 140 which are configured to receive data from the transfer buffer(s) 125 and/or the adapter(s) 130. The data may be stored in buffers 140 for input to an arbiter 145. The arbiter 145 may be configured to accept data from multiple sources (e.g., the buffers 140) and combine (e.g., multiplex) the data into a single data stream that is to be transmitted from the arbiter module 135, and then the multiplexed data may be stored in a transmit buffer 150 prior to transmission from the electronic system 100 via an output link (e.g., from a DFP or UFP).

The arbiter 145 may allocate the data to the transmit buffer based on, for example, the different latency or priority requirements of the data or some other criteria. In some embodiments, the data may be transferred from the buffers 140 to the arbiter in accordance with a first in first out (FIFO) configuration, while in other embodiments the data may be allocated in some other manner.

It will be understood that the above-described embodiment is intended as an example embodiment, and other variations may be present in other embodiments. For example, although only two elements such as traffic generators 105, transfer buffers 125, adapters, 130 are depicted, in other embodiments more or fewer elements may be present. For example, in some embodiments only a single adapter 130 may be present between the buffer controller 110 and the arbiter module 135. Additionally, in other embodiments additional modules or elements may be present, or the configuration of the various elements may be different such that the described data pathway includes more or fewer elements, or elements in a different order.

Figure 2:
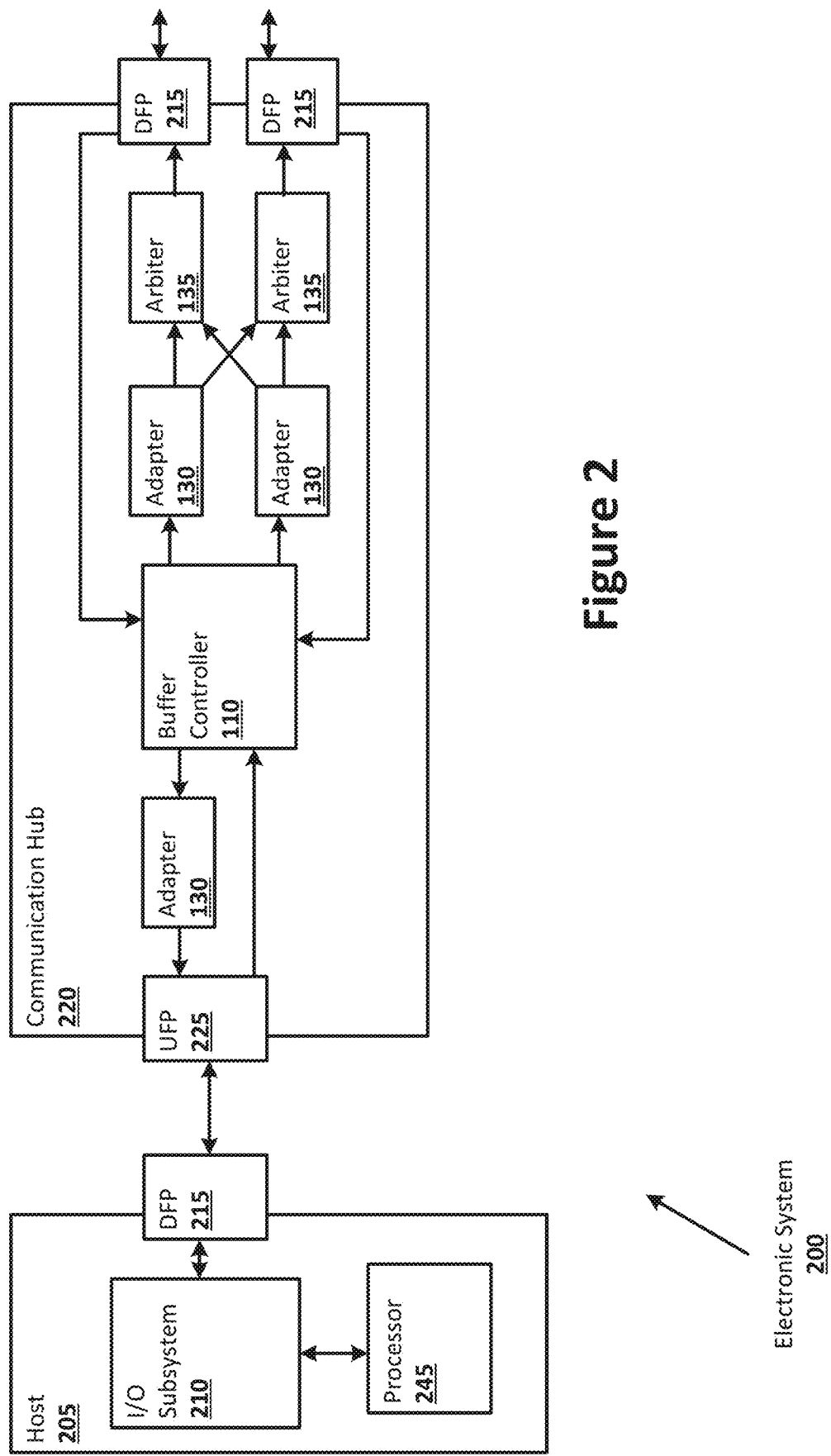
FIG. 2 illustrates an example electronic system that includes a host and a communication hub, in accordance with various embodiments.
Figure 3:
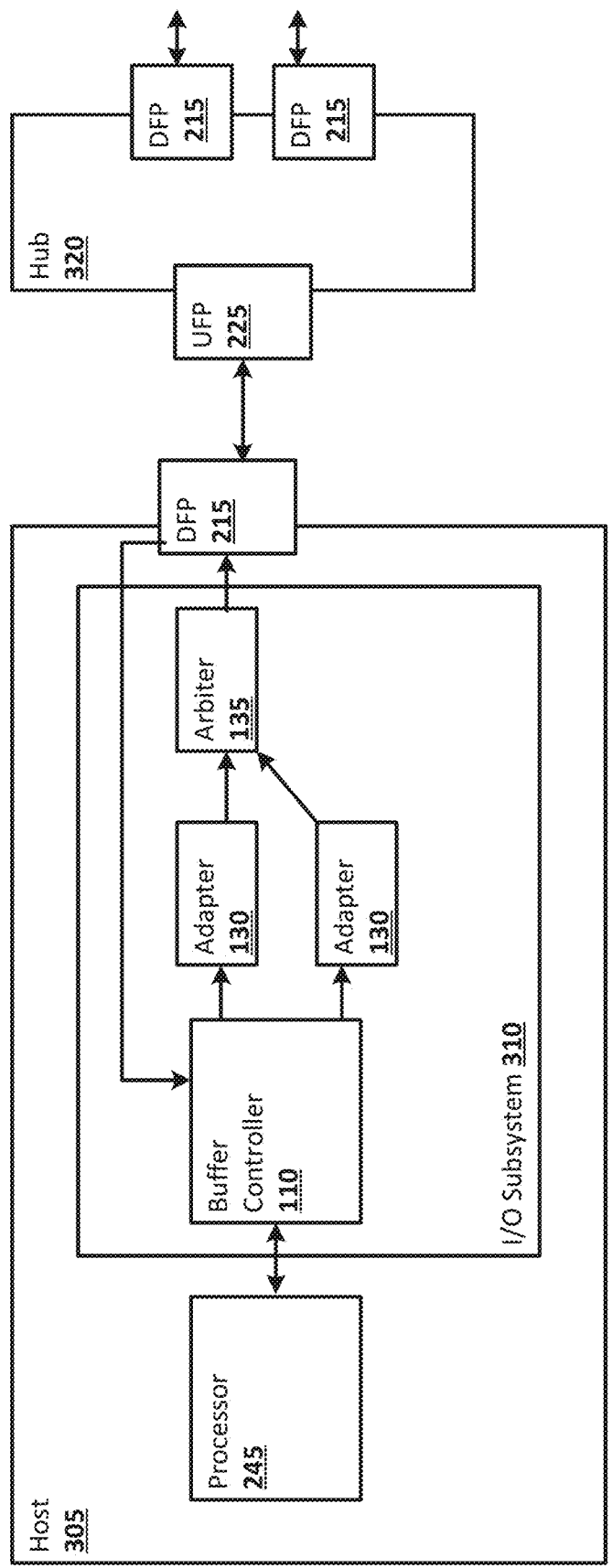
FIG. 3 illustrates an alternative example electronic system that includes a host and a communication hub, in accordance with various embodiments.

Similarly, the following FIGS. 2 and 3 are likewise intended as example embodiments for the sake of discussion. In other embodiments, more or fewer elements may be present, elements may be configured differently, etc. For example, in certain embodiments depicted adapters may not be necessary, and so may not be present. In other embodiments additional adapters or arbiter modules may be present. It will further be understood that different elements of FIGS. 1-3 may be implemented as hardware, software, firmware, or some combination thereof.

FIG. 2 illustrates an example electronic system 200 that includes a host 205 and a communication hub 220, in accordance with various embodiments. Specifically, the communication hub 220 may include a UFP 225 and a plurality of DFPs 215. The communication hub 220 may further include a plurality of adapters 130, arbiter modules 135, and a buffer controller 110 as shown.

As may be seen, the communication hub 220 may be coupled with a host 205. The host 205 may include a processor 245 that is communicatively coupled with a DFP 215 by I/O subsystem 210. The processor 245 may be, for example, a processor, a process core of a multi-core processor, a multi-core processor, a CPU, etc. The I/O subsystem 210 may be configured to buffer data received via the DFP 215 and provide that data to the processor 245. The I/O subsystem 210 may additionally or alternatively be configured to buffer data received from the processor 245 and provide that data to the DFP 215. In some embodiments, the I/O subsystem may include one or more adapters or arbiter modules such as adapters 130 or arbiter modules 135.

In general, the communication hub 220 may be considered to be bidirectional. That is, the communication hub 220 may be configured to received data from the host 205 by UFP 225. The data from the UFP 225 may be provided to the buffer controller 110 as shown. The data may then be output from the buffer controller 110 to one or more adapters 130, which may be communicatively coupled with one or more arbiter modules 135 as shown. The data may then be output from the communication hub 220 by DFPs 215. Although not shown, in some embodiments an adapter such as adapter 130 may be placed in the data stream to receive data from the UFP 225, change a format of the data, and provide the data to the buffer controller 110. In this embodiment, one or both of the host 205, the UFP 225, or some other element may be considered to be a traffic generator such as traffic generator 05.

Additionally or alternatively, the communication hub 220 may receive data from another computing element via DFPs 215. The data may be provided directly from the DFPs 215 to the buffer controller 110. In some embodiments, as described above, an adapter 130 may be positioned between one or more of the DFPs 215 and the buffer controller 110 to change a format of the data received from the DFPs 215. The data may then be output from the buffer controller 110 to an adapter 130, and then from the adapter 130 to the UFP 225. Although not shown, in another embodiment an arbiter module such as arbiter module 135 may be present between adapter 130 and UFP 225. The arbiter module may be desirable if, for example, the buffer controller 110 output a plurality of data streams to a plurality of adapters 130, and it was necessary to multiplex such data prior to transmission of the data on the UFP 225. In this embodiment, the DFP(s) 215 and/or the peripherals or device to which the DFP(s) 215 are coupled may be considered to be a traffic generator such as the traffic generators 105 of FIG. 1.

FIG. 3 illustrates an alternative example electronic system 300 that includes a host 305 and a communication hub 320, in accordance with various embodiments. In some embodiments, the communication hub 320 may have one or more elements similar to those of communication hub 220 (e.g., a buffer controller 110, the various adapters 130 or arbiter modules 135, etc.). In other embodiments, the communication hub 320 may not be configured for power-conscious buffering, and so may not have the above-described buffer controller 110.

The host 305 may be similar to host 205, as described above. Specifically, the host 305 may include a processor 245. The host 305 may further include an I/O subsystem 310 which may be similar to I/O subsystem 210 as described above. However, as may be seen, the I/O subsystem 310 may include a buffer controller 110, a plurality of adapters 130, and an arbiter module 135 that are communicatively coupled between the processor 245 and the DFP 215.

In some embodiments, data may be received from the hub 320 on DFP 215 of the host 305. The data may be transmitted to the buffer controller 110. Although not shown, in some embodiments, an adapter such as adapter 130 may be communicatively coupled between the DFP 215 and the buffer controller 110 and configured to change the format of the data from that received on the DFP 215 to a format that the buffer controller 110 is capable of processing. The data may then be output from the buffer controller 110 to the processor. Although not shown, in some embodiments one or more adapters 130 may be positioned between the buffer controller 110 and the processor 245. Additionally or alternatively, in some embodiments (e.g., if the buffer controller 110 is outputting a plurality of data streams), an arbiter module 135 may be positioned between the buffer controller 110 and the processor 245. In this embodiment, the DFP 215 and/or the communication hub 320 may be considered to be a traffic generator such as traffic generator 105.

Additionally or alternatively, in some embodiments the processor 245 may be configured to be a traffic generator such as traffic generator 105. Specifically, the processor 245 may generate data that is output to the buffer controller 110. The buffer controller may process the data as described above, and then output the data to adapters 130 where it is reformatted and provided to arbiter module 135. The data may then be output from the arbiter module 135 to a DFP 215. As described above, in some embodiments an adapter (not shown) may be present between the processor 245 and the buffer controller 110.

Figure 9:
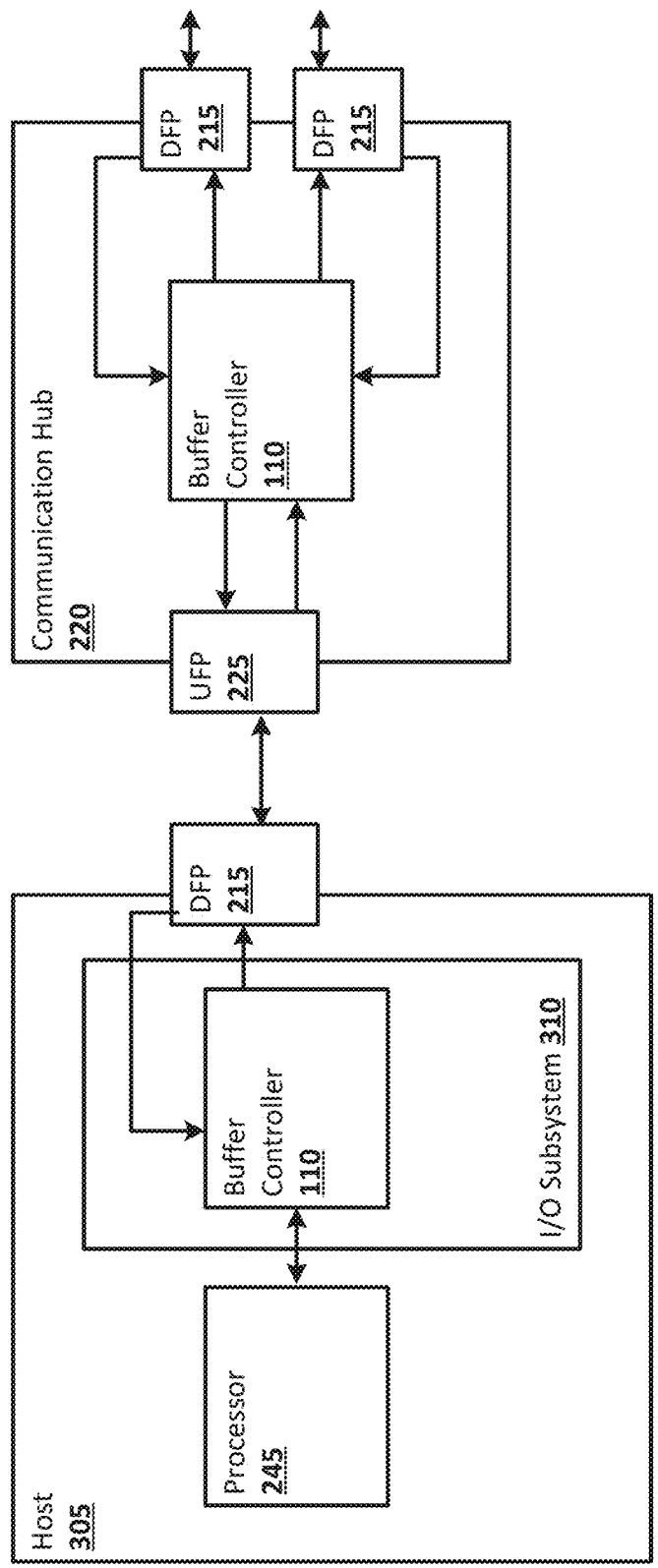
FIG. 9 illustrates an alternative example electronic system that includes a host and a communication hub, in accordance with various embodiments.

As previously noted, in some embodiments the host 305, which may include an I/O subsystem 310 with a buffer controller 110, may be used with a communication hub that includes a buffer controller 110 such as communication hub 220. FIG. 9 depicts an example of such an electronic system 900. It will be noted that FIG. 9 is intended as a highly-simplified block diagram, and certain elements such as arbiter module(s) 135 and/or adapter(s) 130 are not depicted in FIG. 9 for the sake of clarity and lack of clutter of the Figure.

Figure 4:
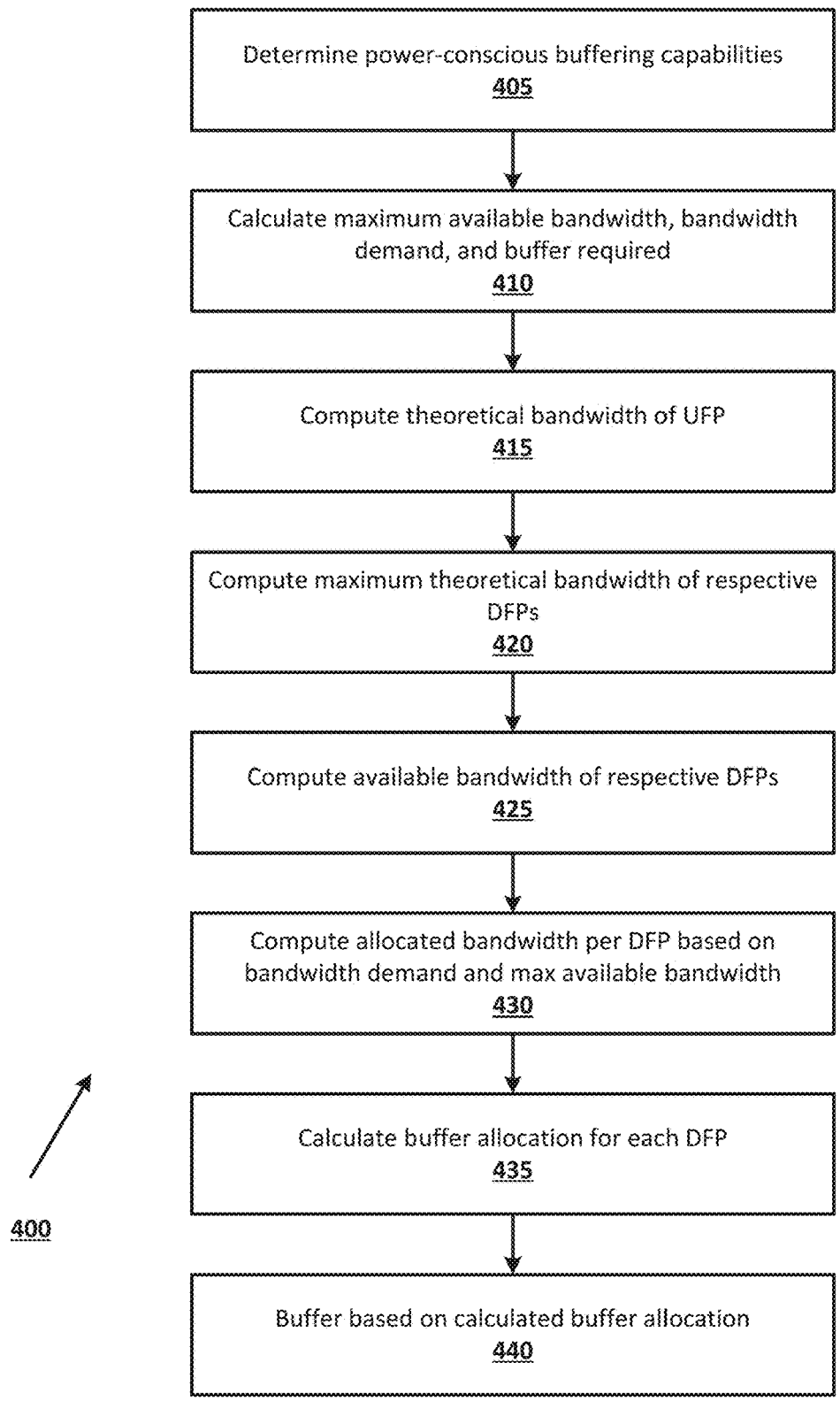
FIG. 4 illustrates an example technique for power-conscious buffer management, in accordance with various embodiments.

FIG. 4 illustrates an example technique 400 for power-conscious buffer management, in accordance with various embodiments. The technique may include determining, at 405, power optimization capabilities of an electronic device. For example, a host such as host 205 or 305 may query various entities in the data path to determine whether the various entities are configured for power-conscious buffering. Such a query may involve identifying, for example based on a table that includes indication of capabilities of different elements of an electronic system such as electronic systems 100, 200, 300, whether the host 205/305, hub 220/320, or a connected device support power-conscious buffering. In another embodiment, the query may additionally or alternatively include transmitting a request to one or more of the hub or connected device, and then identify a response to the query. In other embodiments, the query may be performed in other ways. If the power-conscious buffering is supported, in some embodiments the host may further identify what type of buffers are present in one or more of the host, hub, or device (e.g., different buffer types that may be based on buffer usage or allocation, and which may be or include a dedicated buffer for each I/O transfer type or a shared buffer among two or more of the I/O transfer types.), a size of the buffer in one or more of the device, hub, or host, a scheduling interval for any data transfer type, or some other parameter. With respect to the scheduling interval, this parameter may be programmable by the host, and may be further influenced by device type (e.g., whether the device is a storage device, a camera, an audio device, a display, etc.). It will be understood that, although this element is described as being performed by the host 205 and, for example, an I/O module 210 or processor 245 of the host, in other embodiments one or more of these queries may be performed by an element of, e.g., the communication hub 220 and, particularly, a buffer controller such as buffer controller 110 or a bandwidth management module such as bandwidth management module 115.

Based on the identification that power-conscious buffering is supported by, e.g., an element such as a host or communication hub, power-conscious buffering may be performed. The following elements of FIG. 4 will be described using the case where data is received on a UFP such as UFP 225 of communication hub 220, and then output on DFPs 215 of the communication hub. It will be understood, however, that the below-described technique may be revised to operate in the opposite direction, or may be adapted to be implemented by buffer controller 110 of host 305.

In this embodiment, the technique 400 may further include calculating, at 410 by bandwidth management module 115, the maximum available bandwidth of the communication hub, the bandwidth demand of the data transfer, and the buffer required for the data transfer. For example, the bandwidth management module may identify power parameters for each DFP and/or UFP. For example, the bandwidth management module may identify whether respective ports are USB3.x ports, USB4 ports, or some other type of port. The bandwidth management module may further identify the different power parameters related to different low-power states (e.g., U1/U2/U3, Cl1/Cl2/Cld, etc.) for the different ports. In some embodiments, these power parameters may relate to entry and exit times to or from different Ux or Clx states, the power consumption in the different Ux or Clx states, and the power consumption in U0 or Cl0 states. These power-related parameters may be used to determine how much bandwidth from the available bandwidth of an active port may be allocated to an I/O transfer to ensure the I/O transfer is successful without impacting the I/O transfer requirements. Therefore, the power-considerations related to different ports may inform which ports may be active, and for how long, or how long it may take to change a power state for a given port.

In some embodiments, element 410 may additionally or alternatively include identifying the width, speed, and/or bandwidth demand for respective DFPs. For example, the total amount of data that is intended to be transmitted and received by a given DFP may inform its bandwidth demand.

In some embodiments, element 410 may additionally or alternatively identify the number or type of buffers available in a given host, communication hub, or device. In some embodiments, this identification may be limited to the device in which the buffer controller 110 is implemented.

In some embodiments, element 410 may additionally or alternatively include identifying whether an I/O transfer type is periodic or non-periodic.

The technique 400 may further include computing, at 415 by a bandwidth management module, a theoretical bandwidth of the UFP. This theoretical bandwidth may be pre-identified and based on specifications related to the specific type of port or connection (e.g., USB3.x or USB4) that are used for the UFP. The theoretical bandwidth may be used to identify the maximum amount of data which may be transmitted through the UFP. In embodiments such as those of FIG. 3, this element may be altered to identify the theoretical maximum amount of data which may be produced by a processor such as processor 245.

The technique 400 may further include computing, at 420 by a bandwidth management module, the maximum theoretical bandwidth of one or more of the DFPs. This theoretical bandwidth may be pre-identified and based on specifications related to the specific type of port or connection (e.g., USB3.x or USB4) that are used for the respective DFPs.

The technique 400 may further include computing, at 425 by a bandwidth management module, a maximum available bandwidth which may be allocated to respective DFPs of the one or more DFPs. This maximum available bandwidth may be based on the width, speed, and/or bandwidth demand of respective ones of the DFPs that was calculated at element

410. For example, if it is known from element 420 that the DFP has a maximum theoretical bandwidth of max, and will require a bandwidth of x to transmit a given amount of data, then the maximum available bandwidth may be calculated as max−x.

The technique 400 may further include computing, at 430 by the bandwidth management module, an allocated bandwidth per DFP based on bandwidth demand and maximum available bandwidth of the respective DFPs. Specifically, the allocated bandwidth per DFP may be based on the value x described above with respect to element 425.

The technique 400 may further include calculating, at 435 by the bandwidth management module based on the allocated bandwidth, a buffer allocation for each DFP. Specifically, the buffer allocation may be a function of one or more parameters such as an acceptable residency of the DFP in a given Ux or Clx state, the I/O transfer scheduling interval identified at 405, the bandwidth allocated at 430, and the number of types of buffers available. In some embodiments, this buffer allocation may be based on a single buffer, or separate buffers for each I/O transfer type. Specifically, if the size of an available buffer allows buffer of data of an I/O transfer type while meeting I/O transfer and power management latency parameters, then that data may be buffered by the available buffer. If there the buffer is shared between different I/O transfer types, then the buffer may become full from data of one I/O transfer type and may therefor impact subsequent buffering of other I/O transfer data. However, if the buffer is a dedicated to one type of I/O transfer data, then the I/O transfer buffering of one I/O transfer may not impact the buffering of another I/O transfer.

The calculated buffer allocation may be provided to a buffer management module such as buffer management module 120. The technique 400 may then further include buffering, at 440 by the buffer management module 120, the data based on the buffer allocation. Such buffer may include transmitting the data to one or more of the adapters or buffers depicted in any one of FIGS. 1-3. Specifically, the data may be buffered to be transmitted by a DFP based on the above-described parameters.

Figure 5:
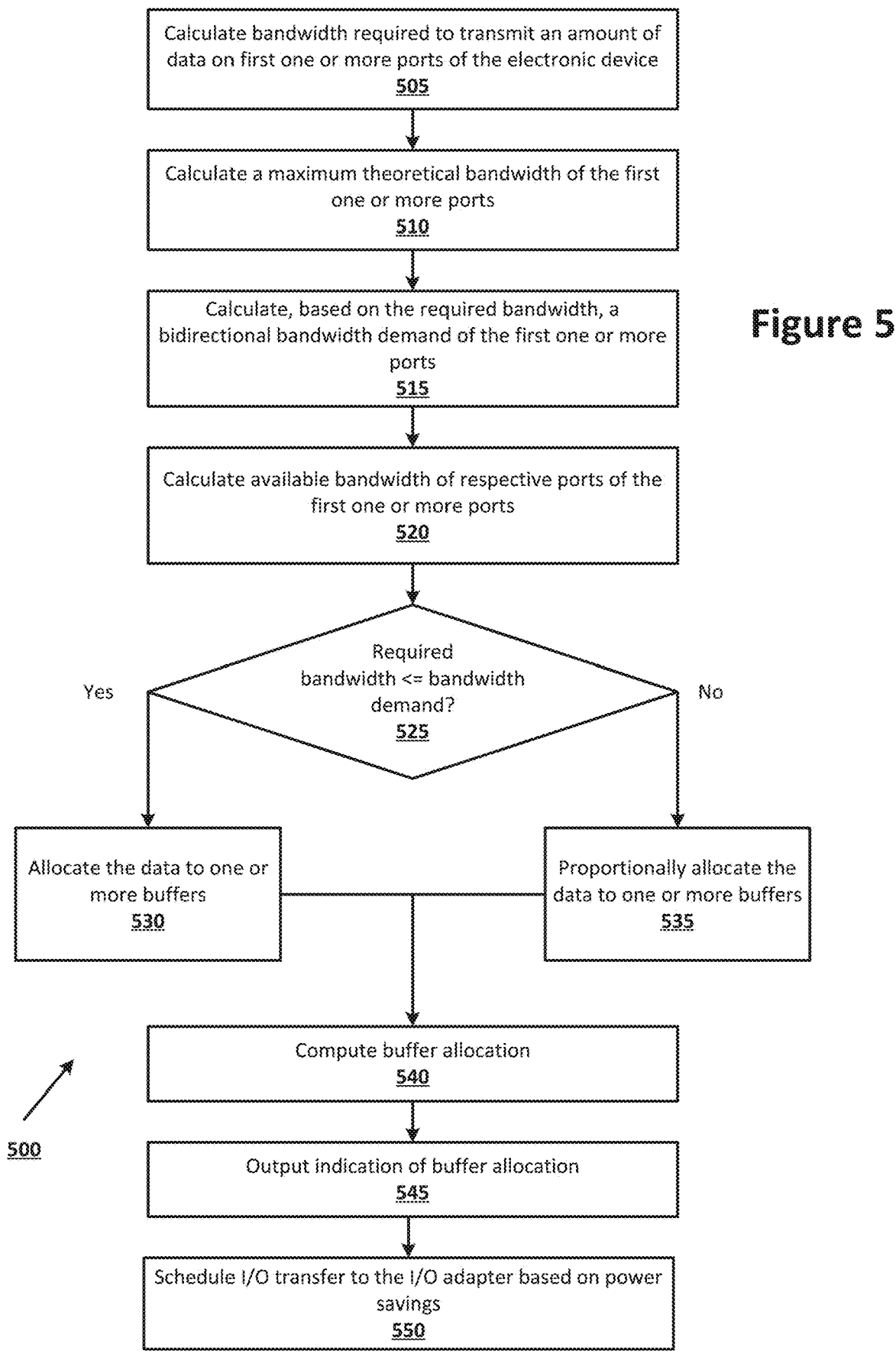
FIG. 5 illustrates an alternative example technique for power-conscious buffer management, in accordance with various embodiments.

FIG. 5 illustrates an alternative example technique 500 for power-conscious buffer management, in accordance with various embodiments. Generally, the technique 500 of FIG. 5 may be considered to be performed by a bandwidth management module such as bandwidth management module 115. Generally, FIG. 5 may be viewed as an alternative example of the specific scenario of FIG. 4.

The technique 500 may include calculating, at 505, a bandwidth required to transmit an amount of data on first one or more ports of the electronic device. The calculation of the bandwidth required may be based on an identified amount of data, a maximum theoretical bandwidth of a traffic generator such as a processor or port, or some other factor.

The technique 500 may further include calculating, at 510, a maximum theoretical bandwidth of the first one or more ports. As described above with respect to element 410, the maximum theoretical bandwidth may be a function of the number of ports, the width of the ports, and/or the speed of the ports.

The technique 500 may further include calculating, at 515 based on the required bandwidth calculated at 505, a bidirectional bandwidth demand of the first one or more ports. Specifically, as described above with respect to element 425, the bidirectional bandwidth demand may be based on the sum of the bandwidth required by all I/O transfers on each port. In other words, the bidirectional bandwidth demand may be a sum of the data being received by the respective ports and the data being transmitted by the respective ports.

The technique 500 may further include identifying, at 520 based on the bidirectional bandwidth demand calculated at 515 and the maximum theoretical bandwidth calculated at 510, an available bandwidth of the one or more ports. Such available bandwidth may be, for example, x as described above with respect to elements 425 and 430.

The technique 500 may then include comparing, at 525, whether the required bandwidth identified at 505 is less than or equal to the available bandwidth for a port calculated at 525. If the required bandwidth is less than the available bandwidth, then the technique may include allocating, at 530, the data to the identified port. However, if the required bandwidth is greater than the available bandwidth of a port, then the technique 500 may include proportionally allocating, at 535, the data to two or more ports.

The technique may further include computing, at 540 based on the data allocation, a buffer allocation. Specifically, the buffer allocation may be a function of the parameters described above with respect to element 435. The buffer allocation may then be output to a buffer management module at 545. In some embodiments, the buffer management module may schedule transfers of the data based on power-savings considerations at 550. For example, power-related parameters of the ports on which the data is to be transmitted may be considered. In one example, low-power entry/exit latency of the ports may be considered to ensure maximum residency may be attained in the lowest possible power state. However, in some embodiments certain low-power states may not be attainable as exiting from that lower power state may take a longer time than the amount of acceptable idle time for a given communication port or type of data. In some embodiments, the buffer management module may ensure that buffer management is based on a time that is synchronized with a host 205/305 if the host implements similar power-conscious buffering.

Figure 6:
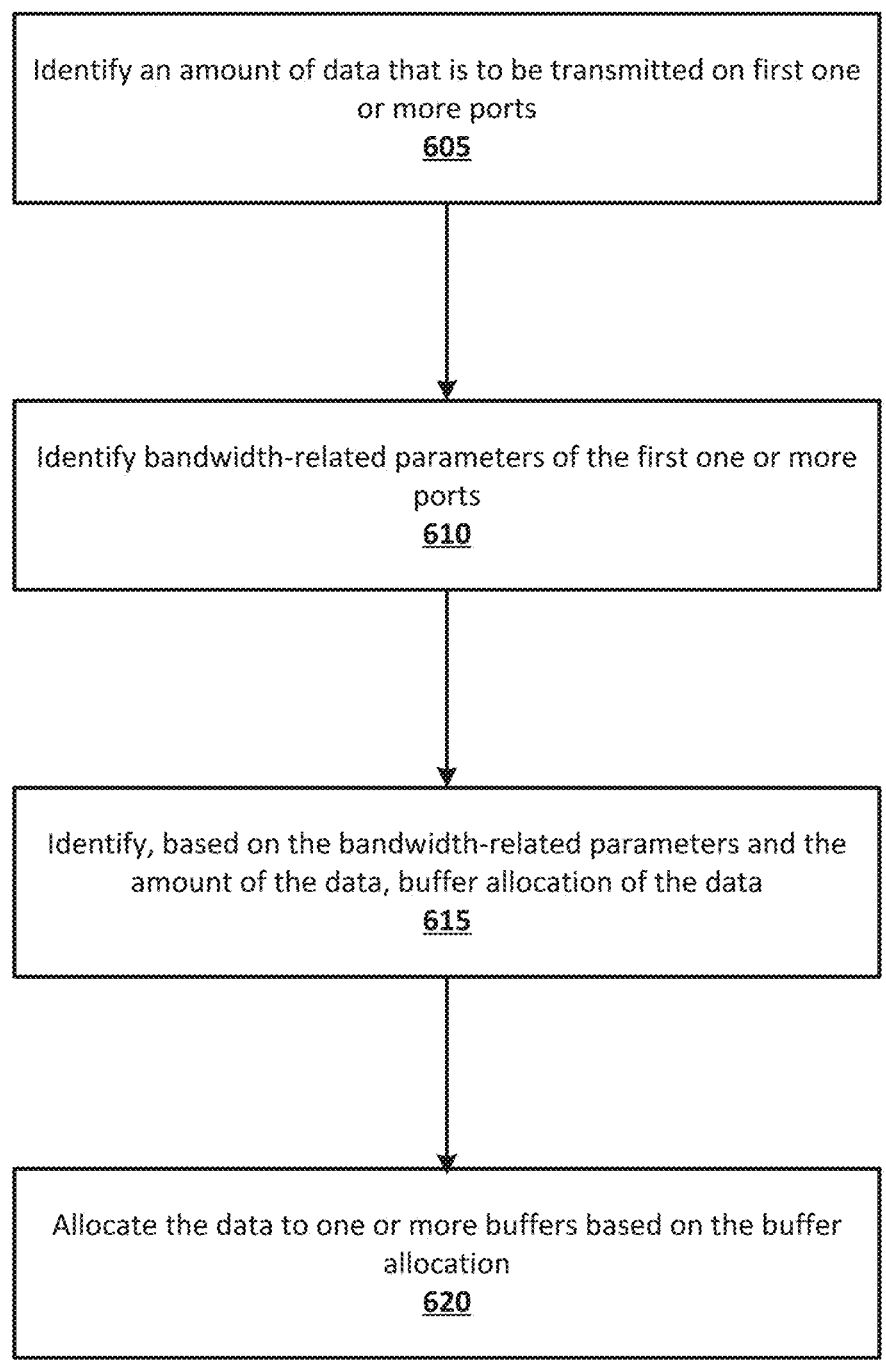
FIG. 6 illustrates an alternative example technique for power-conscious buffer management, in accordance with various embodiments.

FIG. 6 illustrates an alternative example technique 600 for power-conscious buffer management, in accordance with various embodiments. Generally, the technique 600 may be considered to be similar to those of techniques 400 and 500. In embodiments, the technique 600 may be performed by a buffer controller 110 and, more specifically, a bandwidth management module 115.

The technique 600 may include identifying, at 605, an amount of data that is to be transmitted on first one or more ports. The identification may be, or may be related to, an identification of a bandwidth requirement for transmission of the amount of data as described with respect to for example, element 505. As noted, the data may be received on second one or more ports of the electronic device, or it may be generated by a processor of the electronic device.

The technique 600 may further include identifying, at 610, bandwidth-related parameters of the first one or more ports. The bandwidth-related parameters may be, for example, maximum theoretical bandwidth of the first one or more ports, bidirectional bandwidth demand of the first one or more ports, and/or latency requirements of power states of the first one or more ports. In some embodiments, the maximum theoretical bandwidth of a port of the first one or more ports may be based on a width of the port, a speed of the port, and/or a type of the port. In some embodiments, the bandwidth-related parameters may include power consumption in a power state of a host, a communication hub, a port, and/or a buffer. In some embodiments, the bandwidth-related parameters may include a latency requirement of the data.

The technique 600 may further include identifying, based on the bandwidth-related parameters and the amount of the data, buffer allocation of the data. Such identification may be similar to, for example, elements 525, 530, 535, and 540. Specifically, in embodiments the various bandwidth-related parameters may be used to calculate available bandwidth of a port of the one or more ports. The data may then be allocated accordingly to the ports, and that allocation may be used to identify buffer allocation. In some embodiments, the buffer allocation of the data may be further related to a type of a buffer of the one or more buffers, a size of the buffer, and/or a scheduling interval of the buffer.

The technique 600 may then further include allocating, at 620 by a buffer management module, the data to the one or more buffers based on the buffer allocation identified at 615. Such allocation may be similar to that described above with respect to element 545.

It will be understood that FIGS. 4, 5, and 6 are intended as example embodiments for the purposes of discussion. Specifically, other embodiments may have more or fewer elements, elements arranged in a different order, or other variations. Additionally, to the extent that certain parameters are discussed, it will be understood that these parameters are intended as example parameters, and other parameters may additionally or alternatively be used. Other embodiments may vary.

Figure 7:
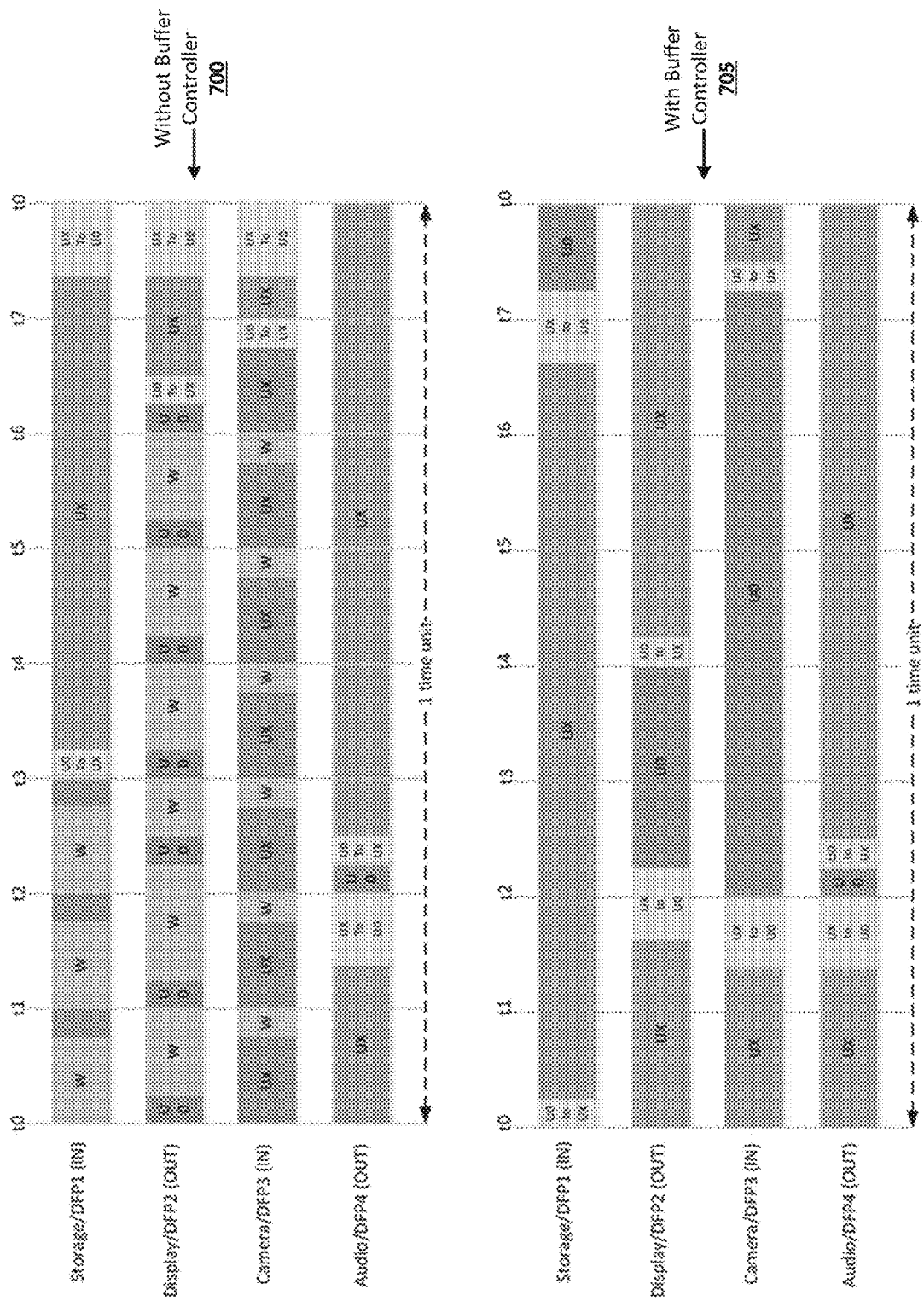
FIG. 7 illustrates an example of power state residency of various subsystems of an electronic system, in accordance with various embodiments.

FIG. 7 illustrates an example of power state residency of various subsystems of an electronic system, in accordance with various embodiments. Specifically, through the use of embodiments above, and as described with respect to element 550, the buffering and transmission of data on various ports may be done in a power-conscious manner. If the data can be consolidated into transmission on a single port, and part of the consolidation is based on power-change latency requirements (e.g., changes between Ux states or Clx states), then repeated switches between power states may be minimized. FIG. 7 shows an example 700 of power states of various DFPs (and the device to which they are coupled) without the power-conscious buffering techniques described above. In this embodiment, the different power states are represented by "U0," "Ux," etc. The elements labelled "W" refer to wait times that are insufficient for deeper Ux entry and exit. It may be seen that, for example with respect to the display/DFP2 element, there are multiple transitions between power states, and multiple wait times "W."

By contrast, 705 depicts an example of power state residency using the techniques described herein. As may be seen, residency in the lowest-power Ux state may be more common with respect to, for example, the Camera/DFP3 and the Display/DFP2. By minimizing power-switching times, and maximizing the time spent in Ux power states, significant power savings may be realized.

Figure 8:
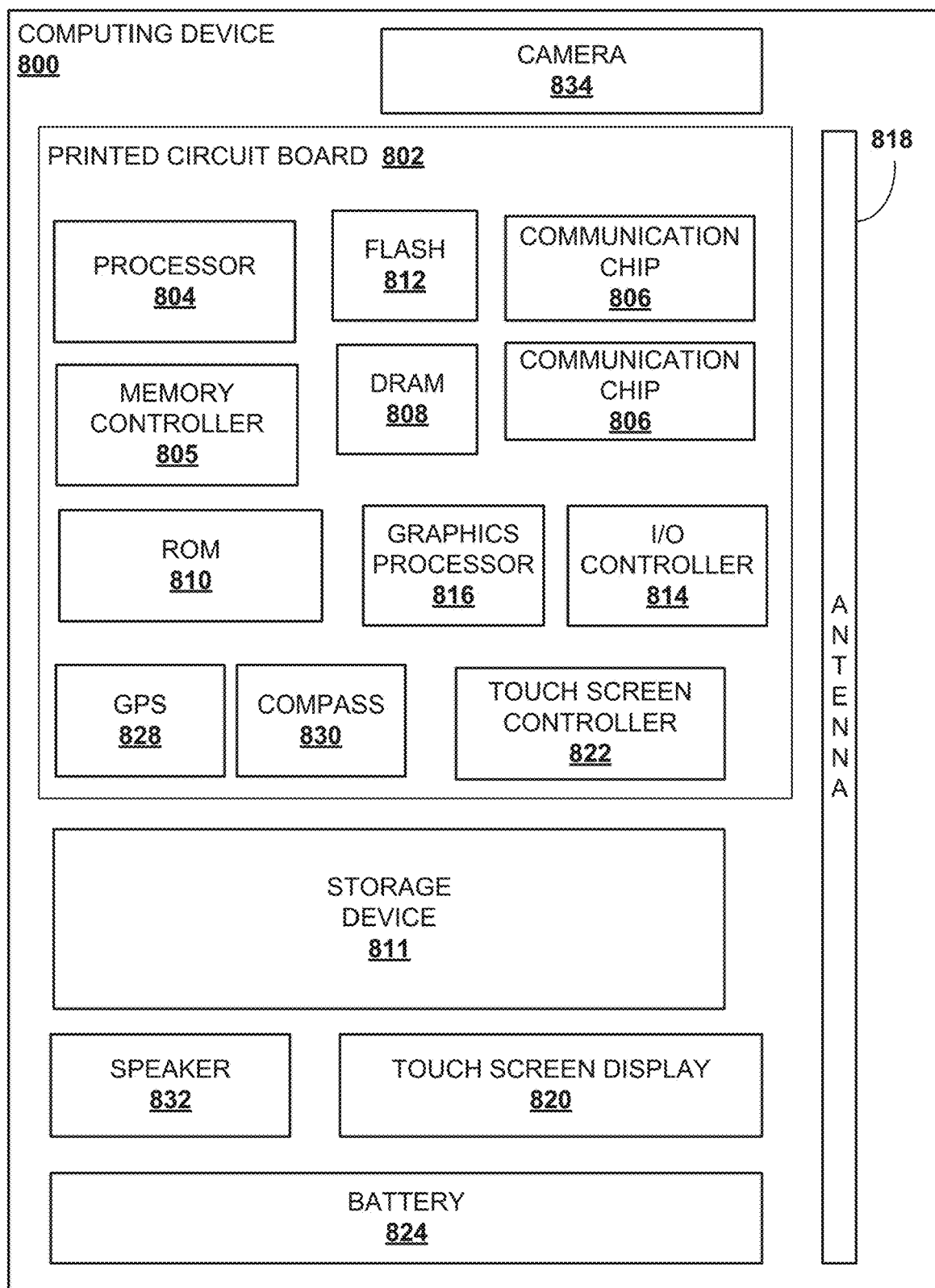
FIG. 8 illustrates an example system configured to employ the apparatuses and methods described herein, in accordance with various embodiments.

FIG. 8 illustrates an example computing device 800 that may employ the apparatuses and/or methods described herein (e.g., integrated circuit 100, process 200, phase lookup procedure 300, etc.), in accordance with various embodiments. As shown, computing device 800 may include a number of components, such as one or more processor(s) 804 (one shown) and at least one communication chip 806. In various embodiments, the one or more processor(s) 804 each may include one or more processor cores. In various embodiments, the at least one communication chip 806 may be physically and electrically coupled to the one or more processor(s) 804. In further implementations, the communication chip 806 may be part of the one or more processor(s) 804. In various embodiments, computing device 800 may include printed circuit board (PCB) 802. For these embodiments, the one or more processor(s) 804 and communication chip 806 may be disposed thereon. In alternate embodiments, the various components may be coupled without the employment of PCB 802.

Depending on its applications, computing device 800 may include other components that may or may not be physically and electrically coupled to the PCB 802. These other components include, but are not limited to, memory controller 805, volatile memory (e.g., dynamic random access memory (DRAM) 808), non-volatile memory such as read only memory (ROM) 810, flash memory 812, storage device 811 (e.g., a hard disk drive (HDD)), an I/O controller 814, a digital signal processor (not shown), a crypto processor (not shown), a graphics processor 816, one or more antenna 818, a display (not shown), a touch screen display 820, a touch screen controller 822, a battery 824, an audio codec (not shown), a video codec (not shown), a global positioning system (GPS) device 828, a compass 830, an accelerometer (not shown), a gyroscope (not shown), a speaker 832, a camera 834, and a mass storage device (such as hard disk drive, a solid state drive, compact disk (CD), digital versatile disk (DVD)) (not shown), and so forth. In various embodiments, the processor 804 may be integrated on the same die with other components to form a System on Chip (SoC).

In some embodiments, the one or more processor(s) 804, flash memory 812, and/or storage device 811 may include associated firmware (not shown) storing programming instructions configured to enable computing device 800, in response to execution of the programming instructions by one or more processor(s) 804, to practice all or selected aspects of the methods described herein. In various embodiments, these aspects may additionally or alternatively be implemented using hardware separate from the one or more processor(s) 804, flash memory 812, or storage device 811.

In various embodiments, one or more components of the computing device 800 may include and/or employ aspects of integrated circuit 100, process 200, phase lookup procedure 300, and/or other circuits or techniques described herein. For example, the processor 804, communication chip 806, I/O controller 814, memory controller 805, and/or another component of computing device 800 may include and/or employ aspects of integrated circuit 100, process 200, phase lookup procedure 300, and/or other circuits or techniques described herein.

The communication chips 806 may enable wired and/or wireless communications for the transfer of data to and from the computing device 800. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 806 may implement any of a number of wireless standards or protocols, including but not limited to IEEE 702.20, Long Term Evolution (LTE), LTE Advanced (LTE-A), 5G, General Packet Radio Service (GPRS), Evolution Data Optimized (Ev-DO), Evolved High Speed Packet Access (HSPA+), Evolved High Speed Downlink Packet Access (HSDPA+), Evolved High Speed Uplink Packet Access (HSUPA+), Global System for Mobile Communications (GSM), Enhanced Data rates for GSM Evolution (EDGE), Code Division Multiple Access (CDMA), Time Division Multiple Access (TDMA), Digital Enhanced Cordless Telecommunications (DECT), Worldwide Interoperability for Microwave Access (WiMAX), Bluetooth, derivatives thereof, as well as any other wireless protocols that are designated as 3G, 4G, 5G, and beyond. The computing device 800 may include a plurality of communication chips 806. For instance, a first communication chip 806 may be dedicated to shorter range wireless communications such as Wi-Fi and Bluetooth, and a second communication chip 806 may be dedicated to longer range wireless communications such as GPS, EDGE, GPRS, CDMA, WiMAX, LTE, Ev-DO, and others.

In various implementations, the computing device 800 may be a laptop, a netbook, a notebook, an ultrabook, a smartphone, a computing tablet, a personal digital assistant (PDA), an ultra-mobile PC, a mobile phone, a desktop computer, a server, a printer, a scanner, a monitor, a set-top box, an entertainment control unit (e.g., a gaming console or automotive entertainment unit), a digital camera, an automobile, a medical device, an appliance, a portable music player, a digital video recorder, an electronic sensor, a smart home device, an internet of things (IoT) device, etc.. In further implementations, the computing device 800 may be any other electronic device that processes data.

Some non-limiting examples of various embodiments are provided below.

Example 1 includes an electronic device comprising: first one or more ports to transmit data from the electronic device; one or more buffers to buffer the data prior to transmission of the data on the first one or more ports; a bandwidth management module to: identify a bandwidth required to transmit an amount of the data on the first one or more ports; identify bandwidth-related parameters of the first one or more ports; and identify, based on the bandwidth-related parameters and the bandwidth required to transmit the amount of the data, buffer allocation of the data; and a buffer management module coupled with the bandwidth management module, the buffer management module to allocate the data to the one or more buffers based on the buffer allocation.

Example 2 includes the electronic device of example 1, or some other example herein, wherein the buffer management module is further to: identify one or more power-state parameters related to transfer of data on the first one or more ports; and schedule, based on the identified power-state parameters, transfer of the data from the one or more buffers.

Example 3 includes the electronic device of example 1, or some other example herein, wherein the data is received on second one or more ports of the electronic device.

Example 4 includes the electronic device of example 1, or some other example herein, wherein the data is generated by a processor of the electronic device.

Example 5 includes the electronic device of example 1, or some other example herein, wherein the bandwidth-related parameters include maximum theoretical bandwidth of the first one or more ports, bidirectional bandwidth demand of the first one or more ports, latency requirements of the data, or latency requirements of power states of the first one or more ports.

Example 6 includes the electronic device of example 5, or some other example herein, wherein the maximum theoretical bandwidth of a port of the first one or more ports is based on a width of the port, a speed of the port, or a type of the port.

Example 7 includes the electronic device of example 1, or some other example herein, wherein the buffer allocation of the data is further related to a type of a buffer, a size of the buffer, or a scheduling interval of the buffer.

Example 8 includes the electronic device of example 1, or some other example herein, wherein the electronic device is a computer system.

Example 9 includes the electronic device of example 1, or some other example herein, wherein the electronic device is a communication hub.

Example 10 includes the electronic device of example 1, or some other example herein, wherein the first one or more ports are universal serial bus (USB) ports.

Example 11 includes the electronic device of example 1, or some other example herein, wherein the first one or more ports are downstream facing ports (DFPs) of the electronic device.

Example 12 includes the electronic device of example 1, or some other example herein, wherein the first one or more ports is an upstream facing port (UFP) of the electronic device.

Example 13 includes one or more non-transitory computer-readable media comprising instructions that, upon execution of the instructions by a bandwidth management module of an electronic device, are to cause the bandwidth management module to: calculate a bandwidth required to transmit an amount of data on first one or more ports of the electronic device; calculate a maximum theoretical bandwidth of the first one or more ports; calculate based on the bandwidth required to transmit the amount of data, a bidirectional bandwidth demand of the first one or more ports; identify, based on comparison of the bidirectional bandwidth demand to the bandwidth required to transmit the amount of data, a buffer allocation of the data to one or more buffers of the electronic device; and output, by the bandwidth management module to a buffer management module, an indication of the buffer allocation.

Example 14 includes the one or more non-transitory computer-readable media of example 13, or some other example herein, wherein the data is to be stored in the one or more buffers based on the buffer allocation.

Example 15 includes the one or more non-transitory computer-readable media of example 14, or some other example herein, wherein the data is to be transferred from the one or more buffers based on one or more power-related parameters of the first one or more ports.

Example 16 includes the one or more non-transitory computer-readable media of example 13, or some other example herein, wherein the maximum theoretical bandwidth is based on a number of the first one or more ports, a width of respective ports of the first one or more ports, and a type of respective ports of the first one or more ports.

Example 17 includes the one or more non-transitory computer-readable media of example 13, or some other example herein, wherein the bidirectional bandwidth demand is based on a sum of bandwidth required by data transfers on respective ports of the first one or more ports.

Example 18 includes the one or more non-transitory computer-readable media of example 13, or some other example herein, wherein the calculation of the amount of data is based on bandwidth of second one or more ports on which the data is received.

Example 19 includes the one or more non-transitory computer-readable media of example 13, or some other example herein, wherein the buffer allocation includes allocating the data to a port of the one or more ports if the bandwidth required to transmit the amount of data is less than or equal to an available bandwidth of the port of the one or more ports.

Example 20 includes the one or more non-transitory computer-readable media of example 13, or some other example herein, wherein the buffer allocation includes proportionally allocating a portion of the data to two or more ports of the first one or more ports if the bandwidth required to transmit the amount of data is greater than available bandwidth of a port of the first one or more ports.

Example 21 includes the one or more non-transitory computer-readable media of example 13, or some other example herein, wherein the buffer allocation is based on a latency requirement of the data or a scheduling interval of the buffer.

Example 22 includes a bandwidth management module of an electronic device, the bandwidth management module to: identify an amount of data that is to be transmitted on first one or more ports of the electronic device; identify bandwidth-related parameters of the first one or more ports, wherein the bandwidth-related parameters include: maximum theoretical bandwidth of the first one or more ports; bidirectional bandwidth demand of the first one or more ports, wherein the bidirectional bandwidth demand is based on the amount of data; latency requirements of the data; and latency requirements of the first one or more ports; and identify, based on the bandwidth-related parameters and the amount of the data, buffer allocation of the data; and output, to a buffer management module of the electronic device, an indication of the buffer allocation.

Example 23 includes the bandwidth management module of example 22, or some other example herein, wherein the data is received on second one or more ports of the electronic device.

Example 24 includes the bandwidth management module of example 22, or some other example herein, wherein the data is generated by a processor of the electronic device.

Example 25 includes the bandwidth management module of example 22, or some other example herein, wherein the maximum theoretical bandwidth of a port of the first one or more ports is based on a width of the port, a speed of the port, or a type of the port.

Example 26 includes the bandwidth management module of example 22, or some other example herein, wherein the buffer allocation of the data is further related to a type of a buffer, a size of the buffer, or a scheduling interval of the buffer.

Example 27 includes the bandwidth management module of example 22, or some other example herein, wherein the electronic device is a computer system.

Example 28 includes the bandwidth management module of example 22, or some other example herein, wherein the electronic device is a communication hub.

Example 29 includes the bandwidth management module of example 22, or some other example herein, wherein the first one or more ports are universal serial bus (USB) ports.

Example 30 includes the bandwidth management module of example 22, or some other example herein, wherein the first one or more ports are downstream facing ports (DFPs) of the electronic device.

Example 31 includes the bandwidth management module of example 22, or some other example herein, wherein the first one or more ports is an upstream facing port (UFP) of the electronic device.

Although certain embodiments have been illustrated and described herein for purposes of description, this application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second, or third) for identified elements are used to distinguish between the elements, and do not indicate or imply a required or limited number of such elements, nor do they indicate a particular position or order of such elements unless otherwise specifically stated.

What is claimed is:

1. An electronic device comprising:
   first one or more ports to transmit data from the electronic device;
   one or more buffers to buffer the data prior to transmission of the data on the first one or more ports;
   a bandwidth management module to:
      identify a bandwidth required to transmit an amount of the data on the first one or more ports;
      identify bandwidth-related parameters of the first one or more ports; and
      identify, based on the bandwidth-related parameters and the bandwidth required to transmit the amount of the data, buffer allocation of the data; and
   a buffer management module coupled with the bandwidth management module, the buffer management module to allocate the data to the one or more buffers based on the buffer allocation.

2. The electronic device of claim 1, wherein the buffer management module is further to:
   identify one or more power-state parameters related to transfer of data on the first one or more ports; and
   schedule, based on the identified power-state parameters, transfer of the data from the one or more buffers.

3. The electronic device of claim 1, wherein the data is received on second one or more ports of the electronic device.

4. The electronic device of claim 1, wherein the data is generated by a processor of the electronic device.

5. The electronic device of claim 1, wherein the bandwidth-related parameters include maximum theoretical bandwidth of the first one or more ports, bidirectional bandwidth demand of the first one or more ports, latency requirements of the data, or latency requirements of power states of the first one or more ports.

6. The electronic device of claim 1, wherein the buffer allocation of the data is further related to a type of a buffer, a size of the buffer, or a scheduling interval of the buffer.

7. One or more non-transitory computer-readable media comprising instructions that, upon execution of the instructions by a bandwidth management module of an electronic device, are to cause the bandwidth management module to:
   calculate a bandwidth required to transmit an amount of data on first one or more ports of the electronic device;
   calculate a maximum theoretical bandwidth of the first one or more ports;
   calculate based on the bandwidth required to transmit the amount of data, a bidirectional bandwidth demand of the first one or more ports;
   identify, based on comparison of the bidirectional bandwidth demand to the bandwidth required to transmit the amount of data, a buffer allocation of the data to one or more buffers of the electronic device; and
   output, by the bandwidth management module to a buffer management module, an indication of the buffer allocation.

8. The one or more non-transitory computer-readable media of claim 7, wherein the data is to be stored in the one or more buffers based on the buffer allocation.

9. The one or more non-transitory computer-readable media of claim 7, wherein the maximum theoretical bandwidth is based on a number of the first one or more ports, a width of respective ports of the first one or more ports, and a type of respective ports of the first one or more ports.

10. The one or more non-transitory computer-readable media of claim 7, wherein the bidirectional bandwidth demand is based on a sum of bandwidth required by data transfers on respective ports of the first one or more ports.

11. The one or more non-transitory computer-readable media of claim 7, wherein the calculation of the amount of data is based on bandwidth of second one or more ports on which the data is received.

12. The one or more non-transitory computer-readable media of claim 7, wherein the buffer allocation includes allocating the data to a port of the one or more ports if the bandwidth required to transmit the amount of data is less than or equal to an available bandwidth of the port of the one or more ports.

13. The one or more non-transitory computer-readable media of claim 7, wherein the buffer allocation includes proportionally allocating a portion of the data to two or more ports of the first one or more ports if the bandwidth required to transmit the amount of data is greater than available bandwidth of a port of the first one or more ports.

14. The one or more non-transitory computer-readable media of claim 7, wherein the buffer allocation is based on a latency requirement of the data or a scheduling interval of the buffer.

15. A bandwidth management module of an electronic device, the bandwidth management module to:
    identify an amount of data that is to be transmitted on first one or more ports of the electronic device;
    identify bandwidth-related parameters of the first one or more ports, wherein the bandwidth-related parameters include:
        maximum theoretical bandwidth of the first one or more ports;
        bidirectional bandwidth demand of the first one or more ports, wherein the bidirectional bandwidth demand is based on the amount of data;
        latency requirements of the data; and
        latency requirements of the first one or more ports;
    identify, based on the bandwidth-related parameters and the amount of the data, buffer allocation of the data; and
    output, to a buffer management module of the electronic device, an indication of the buffer allocation.

16. The bandwidth management module of claim 15, wherein the data is received on second one or more ports of the electronic device.

17. The bandwidth management module of claim 15, wherein the data is generated by a processor of the electronic device.

18. The bandwidth management module of claim 15, wherein the maximum theoretical bandwidth of a port of the first one or more ports is based on a width of the port, a speed of the port, or a type of the port.

19. The bandwidth management module of claim 15, wherein the buffer allocation of the data is further related to a type of a buffer, a size of the buffer, or a scheduling interval of the buffer.

20. The bandwidth management module of claim 15, wherein the first one or more ports are universal serial bus (USB) ports.

* * * * *